US012597802B2

(12) United States Patent
Wang et al.

(10) Patent No.: US 12,597,802 B2
(45) Date of Patent: Apr. 7, 2026

(54) ELECTRONIC DEVICE SYSTEM AND CONTROL METHOD THEREOF, AND CONTROL APPARATUS OF ELECTRONIC DEVICE FOR TEMPERATURE CONTROL

(71) Applicant: VIVO MOBILE COMMUNICATION CO., LTD., Guangdong (CN)

(72) Inventors: Bingqiong Wang, Guangdong (CN); Xinquan Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 623 days.

(21) Appl. No.: 18/113,440

(22) Filed: Feb. 23, 2023

(65) Prior Publication Data

US 2023/0198304 A1 Jun. 22, 2023

Related U.S. Application Data

(63) Continuation of application No. PCT/CN2021/113688, filed on Aug. 20, 2021.

(30) Foreign Application Priority Data

Aug. 24, 2020 (CN) .......................... 202010861636.0

(51) Int. Cl.
*H02J 7/00* (2006.01)
*H02J 50/00* (2016.01)
(Continued)

(52) U.S. Cl.
CPC ............ *H02J 50/005* (2020.01); *H02J 50/10* (2016.02); *H02J 50/402* (2020.01)

(58) Field of Classification Search
USPC .......................................................... 320/108
See application file for complete search history.

(56) References Cited

U.S. PATENT DOCUMENTS

| | | | | | |
|---|---|---|---|---|---|
| 12,155,225 B2 * | 11/2024 | Han | ........................ | H02J 50/70 |
| 2015/0256021 A1 | 9/2015 | Kwon et al. | | |

(Continued)

FOREIGN PATENT DOCUMENTS

| | | |
|---|---|---|
| CN | 107248775 A | 10/2017 |
| CN | 107437826 A | 12/2017 |

(Continued)

OTHER PUBLICATIONS

First Office Action for Chinese Application No. 202010861636.0, dated Sep. 18, 2021, 6 Pages.

(Continued)

*Primary Examiner* — Samuel Berhanu
(74) *Attorney, Agent, or Firm* — BROOKS KUSHMAN P.C.

(57) ABSTRACT

An electronic device component and a control method thereof, and a control apparatus of an electronic device. In the disclosed electronic device component, a wireless charging apparatus includes a first coil and a second coil, a third coil of a telescopic electronic device is arranged at a telescopic portion, and the telescopic portion is retractable into a body portion or at least partially extends out of the body portion; when the telescopic electronic device is in a first state, the telescopic portion is retracted into the body portion, and the third coil is configured to couple with the first coil for charging; when the telescopic electronic device is in a second state, the telescopic portion at least partially extends out of the body portion, and the third coil is configured to couple with the second coil for charging.

20 Claims, 6 Drawing Sheets

(51) Int. Cl.
    *H02J 50/10*       (2016.01)
    *H02J 50/40*       (2016.01)

(56)            References Cited

U.S. PATENT DOCUMENTS

| | | | |
|---|---|---|---|
| 2015/0326053 | A1 | 11/2015 | Amano et al. |
| 2018/0090968 | A1 | 3/2018 | Pais et al. |
| 2019/0025891 | A1 | 1/2019 | Kim et al. |
| 2019/0319478 | A1 | 10/2019 | Zhang et al. |
| 2021/0119493 | A1* | 4/2021 | Zhang .................... H02J 50/10 |

FOREIGN PATENT DOCUMENTS

| | | | |
|---|---|---|---|
| CN | 108923509 | A | 11/2018 |
| CN | 208890404 | U | 5/2019 |
| CN | 110854977 | A | 2/2020 |
| CN | 210201514 | U | 3/2020 |
| CN | 110989899 | A | 4/2020 |
| CN | 111459333 | A | 7/2020 |
| CN | 112039220 | A | 12/2020 |
| KR | 20180110799 | A | 10/2018 |
| WO | 2012127936 | A1 | 9/2012 |

OTHER PUBLICATIONS

International Search Report and Written Opinion for Application No. PCT/CN2021/113688, dated Nov. 19, 2021, 8 Pages.
Extended European Search Report for Application No. 21860270.4, dated Feb. 8, 2024, 8 Pages.

\* cited by examiner

ELECTRONIC DEVICE SYSTEM AND CONTROL METHOD THEREOF, AND CONTROL APPARATUS OF ELECTRONIC DEVICE FOR TEMPERATURE CONTROL

CROSS-REFERENCE TO RELATED APPLICATIONS

The present application is a continuation of International Application No. PCT/CN2021/113688 filed on Aug. 20, 2021, which claims priority to Chinese Patent Application No. 202010861636.0 filed on Aug. 24, 2020, which are incorporated by reference in their entireties.

TECHNICAL FIELD

This application relates to the field of communication device technologies, and in particular, to an electronic device component and a control method thereof, and a control apparatus of an electronic device.

BACKGROUND

With rapid development of electronic devices, the electronic devices are more and more widely used. Electronic devices such as mobile phones and tablet computers play more and more roles in aspects such as people's work, life and entertainment.

Currently, in the field of charging technology, a to-be-charged device is mainly charged by wired charging. Using a mobile phone as an example, when it is necessary to charge the mobile phone, the mobile phone can be connected to a power supply device through a charging cable (such as a universal serial bus (USB) cable), and output power of the power supply device can be transmitted to the mobile phone through the charging cable to charge a battery in the mobile phone. However, with the popularity of wireless charging, more and more electronic devices support a wireless charging function, and a wireless charging mode is increasingly favored by people.

However, low conversion efficiency of wireless charging leads to serious heating of a wireless charging coil, and more energy is dissipated in a form of heat, resulting in serious heating of the electronic device or a charging base. In addition, when the electronic device is wirelessly charged, the electronic device is closely attached to the charging base, and heat of the charging base and heat of the electronic device are conducted with each other, which leads to higher temperature of the electronic device and the charging base. Heat of a contact region between the electronic device and the charging base cannot be dissipated well, which further leads to more serious heating of the electronic device or the charging base, bringing poor experience to consumers.

SUMMARY

This application discloses an electronic device component and a control method thereof, and a control apparatus of an electronic device.

According to a first aspect, an embodiment of this application discloses an electronic device component. The electronic device component includes a telescopic electronic device and a wireless charging apparatus, where the wireless charging apparatus includes a first coil and a second coil, the telescopic electronic device includes a body portion, a telescopic portion, and a third coil, the third coil is arranged in the telescopic portion, and the telescopic portion is retractable into or at least partially extends out of the body portion; in a case that the telescopic electronic device is opposite to the wireless charging apparatus, one of the first coil and the second coil is configured to couple with the third coil for charging; when the telescopic electronic device is in a first state, the telescopic portion is retracted into the body portion, and the third coil is configured to couple with the first coil for charging; when the telescopic electronic device is in a second state, the telescopic portion at least partially extends out of the body portion, and the third coil is configured to couple with the second coil for charging; in a case that a temperature of the first coil is greater than a first preset temperature, the telescopic electronic device is in the second state; and in a case that a temperature of the second coil is greater than a second preset temperature, the telescopic electronic device is in the first state.

Optionally, in the foregoing electronic device component, the wireless charging apparatus further includes a heat dissipation apparatus, and the heat dissipation apparatus is arranged on a body of the wireless charging apparatus; and in a case that the telescopic electronic device is opposite to the wireless charging apparatus, the heat dissipation apparatus is located at a side of the telescopic electronic device and faces at least one of the body portion and the telescopic portion.

Optionally, in the foregoing electronic device component, the telescopic electronic device further includes a drive mechanism, the drive mechanism is arranged at the body portion, and the drive mechanism is connected to the telescopic portion in a driving manner; in a case that the temperature of the first coil is greater than the first preset temperature, the drive mechanism drives the telescopic portion to at least partially extend out of the body portion; and in a case that the temperature of the second coil is greater than the second preset temperature, the drive mechanism drives the telescopic portion to retract into the body portion.

Optionally, in the electronic device component, the first coil is in a power-off state when the temperature of the first coil is greater than the first preset temperature; and the second coil is in the power-off state in a case that the temperature of the second coil is greater than the second preset temperature.

According to a second aspect, an embodiment of this application discloses a control method of an electronic device component. The electronic device component includes a telescopic electronic device and a wireless charging apparatus, where the wireless charging apparatus includes a first coil and a second coil, the telescopic electronic device includes a body portion, a telescopic portion, and a third coil, the third coil is arranged in the telescopic portion, and the telescopic portion is retractable into or at least partially extends out of the body portion; in a case that the telescopic electronic device is opposite to the wireless charging apparatus, one of the first coil and the second coil is configured to couple with the third coil for charging; when the telescopic electronic device is in a first state, the telescopic portion is retracted into the body portion, and the third coil is configured to couple with the first coil for charging; when the telescopic electronic device is in a second state, the telescopic portion at least partially extends out of the body portion, and the third coil is configured to couple with the second coil for charging; the control method includes: detecting a first temperature of the first coil and a second temperature of the second coil respectively; controlling the telescopic electronic device to be in the second state when the first temperature is greater than the first preset temperature; and controlling the telescopic electronic device to be in the first state when the second temperature is greater than the second preset temperature.

Optionally, in the foregoing control method, the controlling the telescopic electronic device to be in the second state includes: controlling the telescopic electronic device to be in the second state, and controlling the first coil to be in a power-off state; and the controlling the telescopic electronic device to be in the first state includes: controlling the telescopic electronic device to be in the first state, and controlling the second coil to be in the power-off state.

Optionally, in the foregoing control method, the wireless charging apparatus further includes a heat dissipation apparatus, the heat dissipation apparatus is arranged on a body of the wireless charging apparatus, in a case that the telescopic electronic device is opposite to the wireless charging apparatus, the heat dissipation apparatus is located at a side of the telescopic electronic device and faces at least one of the body portion and the telescopic portion, and the control method further includes: controlling the heat dissipation apparatus to be in an operating state when the first temperature is greater than the first preset temperature, or the second temperature is greater than the second preset temperature.

Optionally, in the foregoing control method, the telescopic electronic device further includes a drive mechanism, the drive mechanism is arranged at the body portion, and the drive mechanism is connected to the telescopic portion in a driving manner, and the controlling the telescopic electronic device to be in the second state includes: controlling the drive mechanism to drive the telescopic portion to at least partially extend out of the body portion; and the controlling the telescopic electronic device to be in the first state includes: controlling the drive mechanism to drive the telescopic portion to retract into the body portion.

Optionally, in the foregoing control method, the control method further includes: detecting a battery level of the telescopic electronic device; and controlling, when the battery level is greater than or equal to a preset battery level, the first coil, the second coil, and the third coil to be in the power-off state.

According to a third aspect, an embodiment of this application discloses a control apparatus of an electronic device, the electronic device being a telescopic electronic device, where the telescopic electronic device includes a body portion, a telescopic portion, and a third coil, the third coil is arranged in the telescopic portion, and the telescopic portion is retractable into or at least partially extends out of the body portion; the telescopic electronic device is configured to couple with a wireless charging apparatus for charging, the wireless charging apparatus including a first coil and a second coil; in a case that the telescopic electronic device is opposite to the wireless charging apparatus, one of the first coil and the second coil is configured to couple with the third coil for charging; when the telescopic electronic device is in a first state, the telescopic portion is retracted into the body portion, and the third coil is configured to couple with the first coil for charging; when the telescopic electronic device is in a second state, the telescopic portion at least partially extends out of the body portion, and the third coil is configured to couple with the second coil for charging; the control apparatus including: a first detection module, configured to detect a first temperature of the first coil and a second temperature of the second coil respectively; a first control module, configured to control the telescopic electronic device to be in the second state when the first temperature is greater than the first preset temperature; and a second control module, configured to control the telescopic electronic device to be in the first state when the second temperature is greater than the second preset temperature.

Optionally, in the foregoing control apparatus, the first control module includes: a first control unit, configured to control the telescopic electronic device to be in the second state when the first temperature is greater than the first preset temperature; and a second control unit, configured to control the first coil to be in a power-off state when the first temperature is greater than the first preset temperature; and the second control module includes: a third control unit, configured to control the telescopic electronic device to be in the first state when the second temperature is greater than the second preset temperature; and a fourth control unit, configured to control the second coil to be in the power-off state when the second temperature is greater than the second preset temperature.

Optionally, in the foregoing control apparatus, the wireless charging apparatus further includes a heat dissipation apparatus, the heat dissipation apparatus is arranged on a body of the wireless charging apparatus, in a case that the telescopic electronic device is opposite to the wireless charging apparatus, the heat dissipation apparatus is located at a side of the telescopic electronic device and faces at least one of the body portion and the telescopic portion, and the control apparatus further includes: a third control module, configured to control the heat dissipation apparatus to be in an operating state when the first temperature is greater than the first preset temperature, or the second temperature is greater than the second preset temperature.

Optionally, in the foregoing control apparatus, the telescopic electronic device further includes a drive mechanism, the drive mechanism is arranged at the body portion, the drive mechanism is connected to the telescopic portion in a driving manner, and the first control module includes: a fifth control unit, configured to control the drive mechanism to drive the telescopic portion to at least partially extend out of the body portion when the first temperature is greater than the first preset temperature; and the second control module includes: a sixth control unit, configured to control the drive mechanism to drive the telescopic portion to retract into the body portion when the second temperature is greater than the second preset temperature.

Optionally, in the foregoing control apparatus, the control apparatus further includes: a second detection module, configured to detect a battery level of the telescopic electronic device; and a fourth control module, configured to control, when the battery level is greater than or equal to a preset battery level, the first coil, the second coil, and the third coil to be in the power-off state.

According to a fourth aspect, an embodiment of this application discloses a terminal device. The terminal device includes a processor, a memory, and a program or an instruction stored on the memory and executable on the processor, the program or instruction, when executed by the processor, implementing steps of the foregoing any control method.

According to a fifth aspect, an embodiment of this application discloses a readable storage medium. The readable storage medium stores a program or an instruction, the program or instruction, when executed by a processor, implementing steps of the foregoing any control method.

According to a sixth aspect, an embodiment of this application discloses an apparatus. The apparatus is configured to perform the control method according to the second aspect.

According to a seventh aspect, an embodiment of this application provides a chip. The chip includes a processor and a communication interface, the communication interface is coupled to the processor, and the processor is configured to run a program or an instruction to implement the control method according to the second aspect.

According to an eighth aspect, an embodiment of this application provides a computer program product. The computer program product is stored in a non-volatile storage medium, and the program product is configured to be executed by at least one processor to implement steps of the foregoing control method.

DESCRIPTION OF NUMERALS IN THE DRAWINGS

Figure 1:
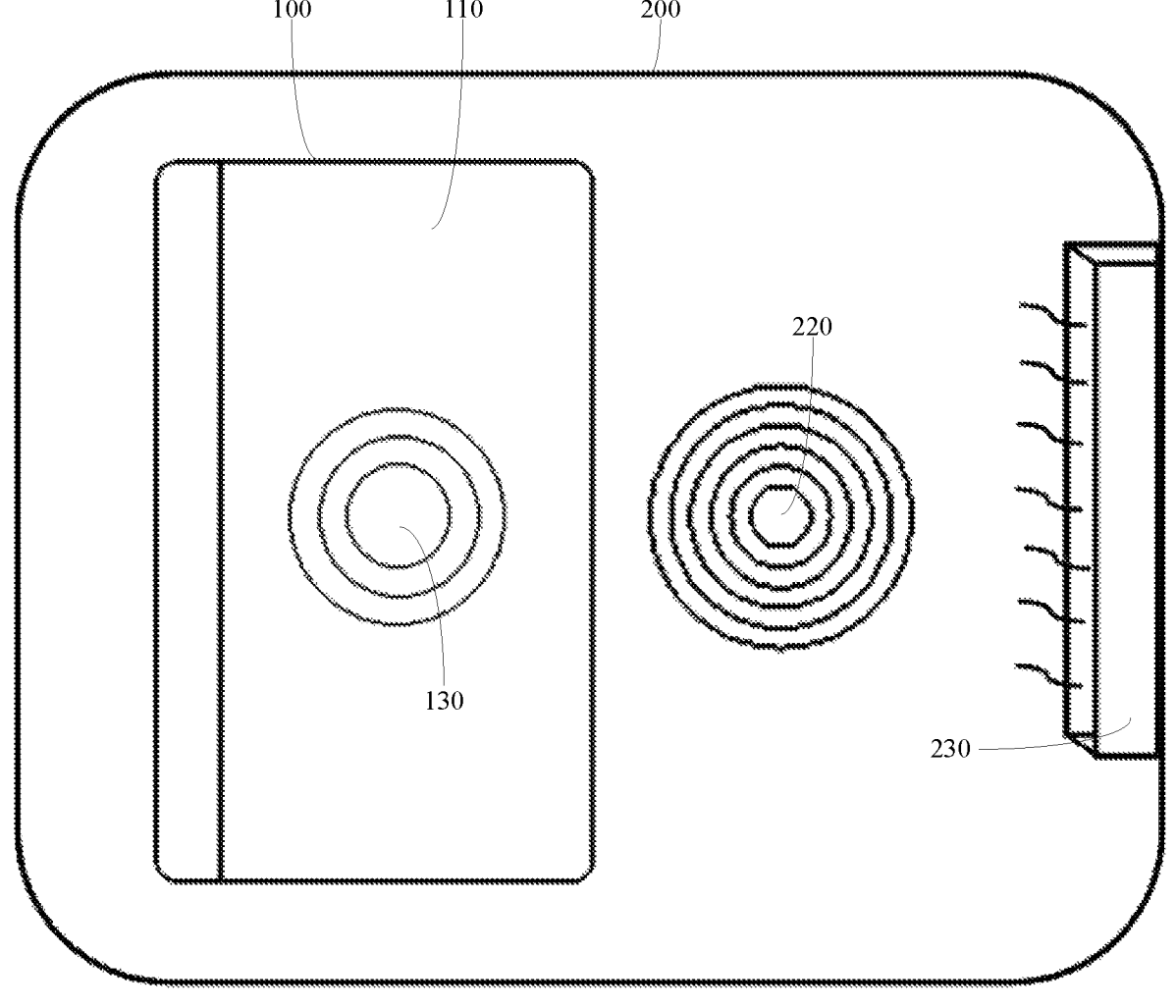
FIG. 1 is a schematic diagram of an electronic device component when a telescopic electronic device is in a first state according to an embodiment of this application.
Figure 2:
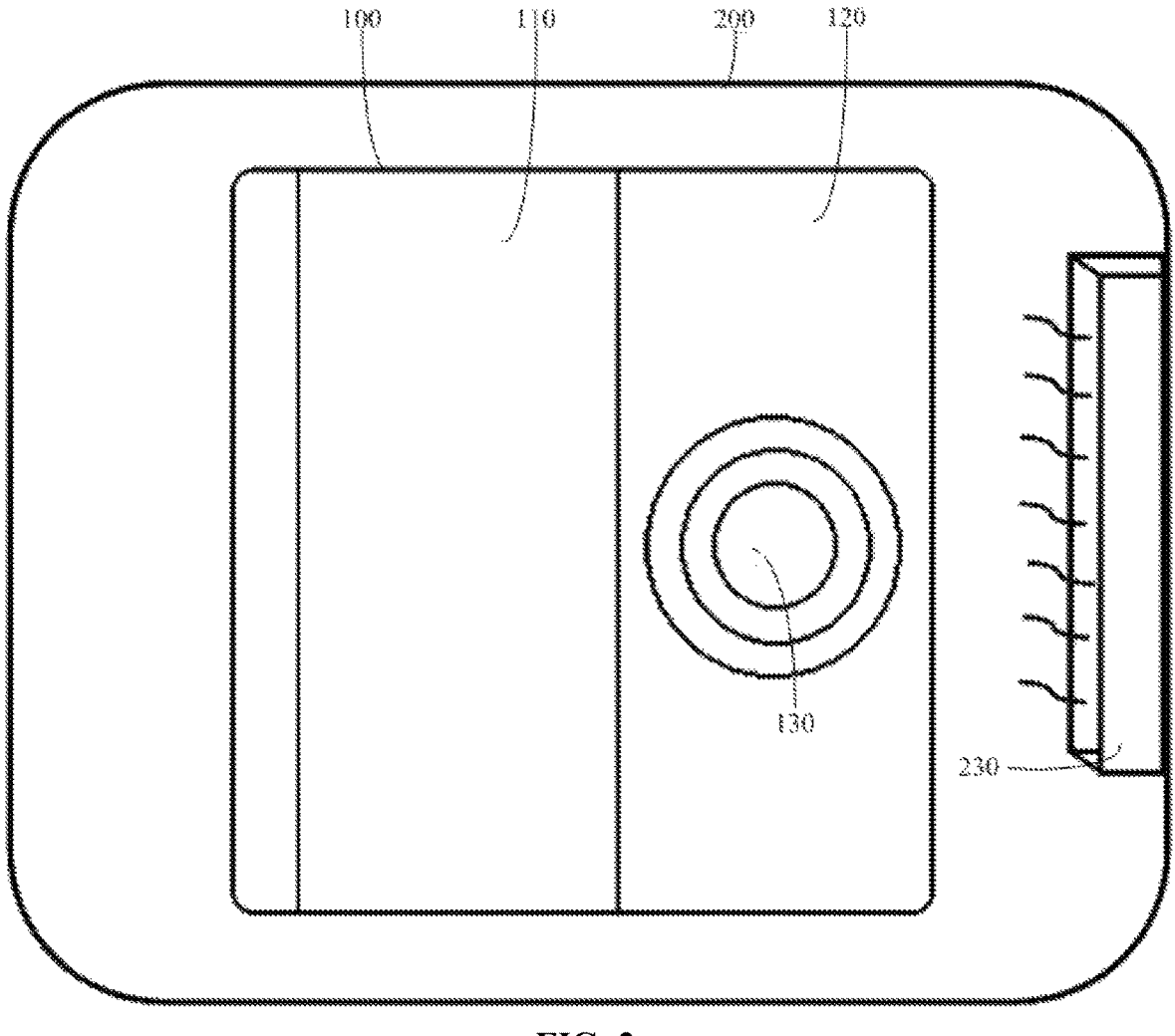
FIG. 2 is a schematic diagram of an electronic device component when a telescopic electronic device is in a second state according to an embodiment of this application.
Figure 3:
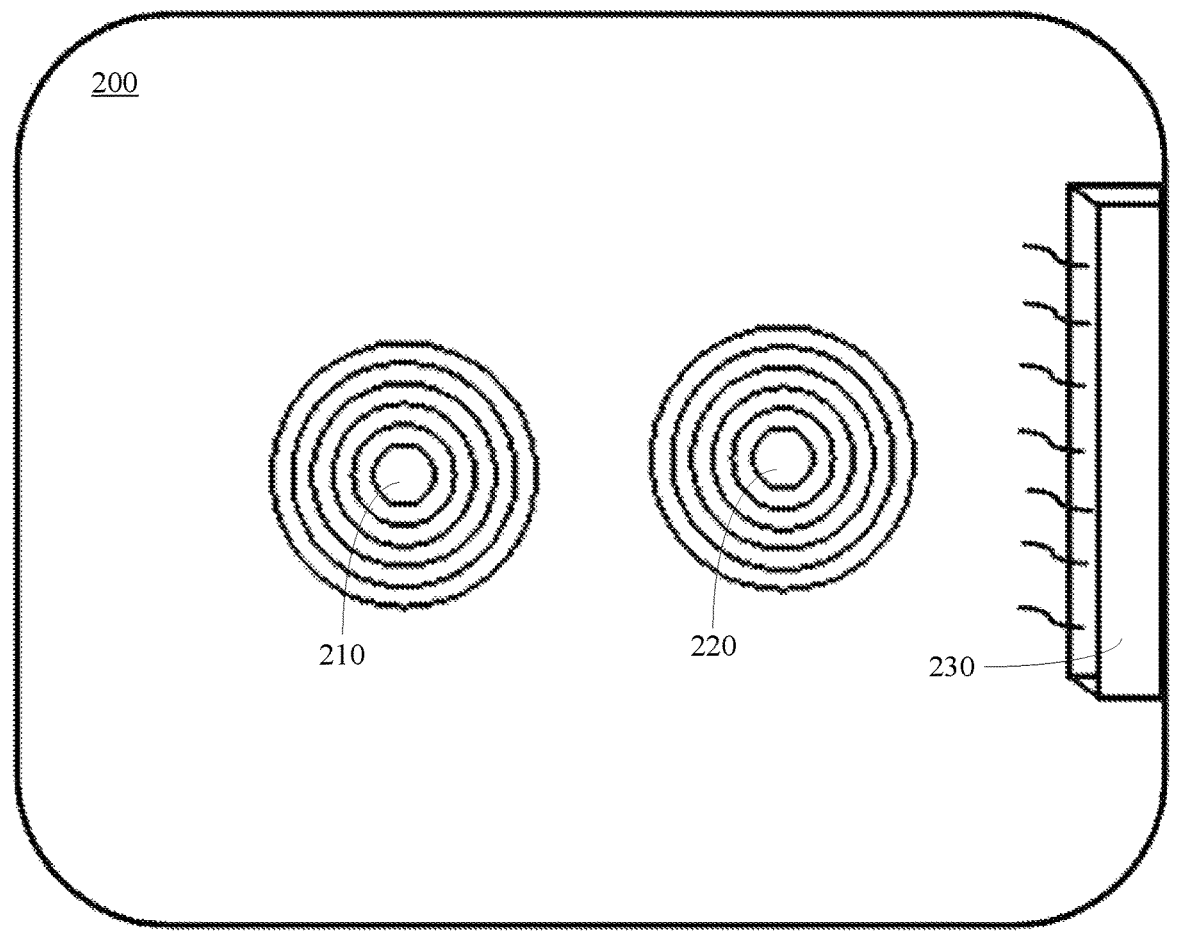
FIG. 3 is a schematic diagram of a wireless charging apparatus according to an embodiment of this application.
Figure 4:
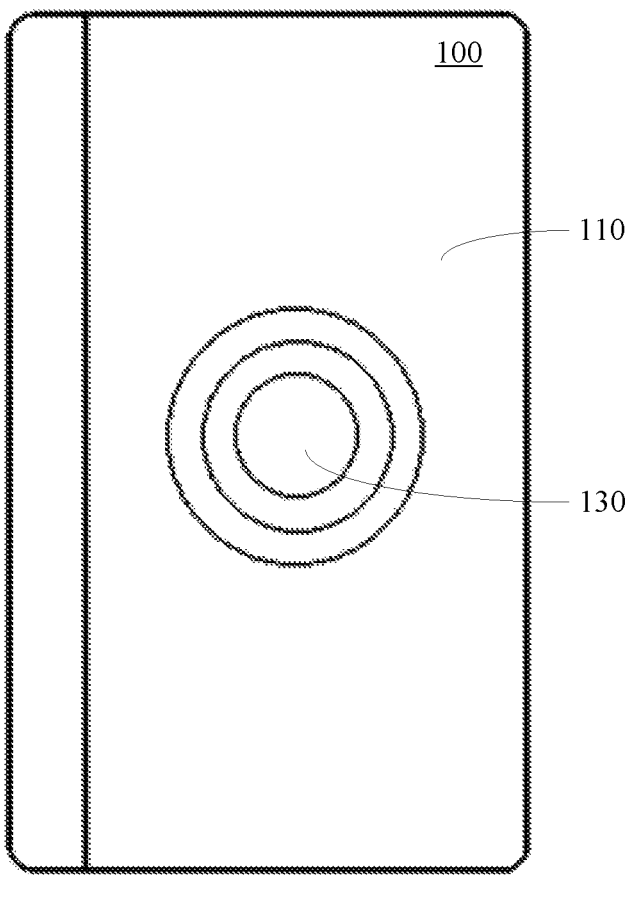
FIG. 4 is a schematic diagram of a telescopic electronic device in a first state according to an embodiment of this application.
Figure 5:
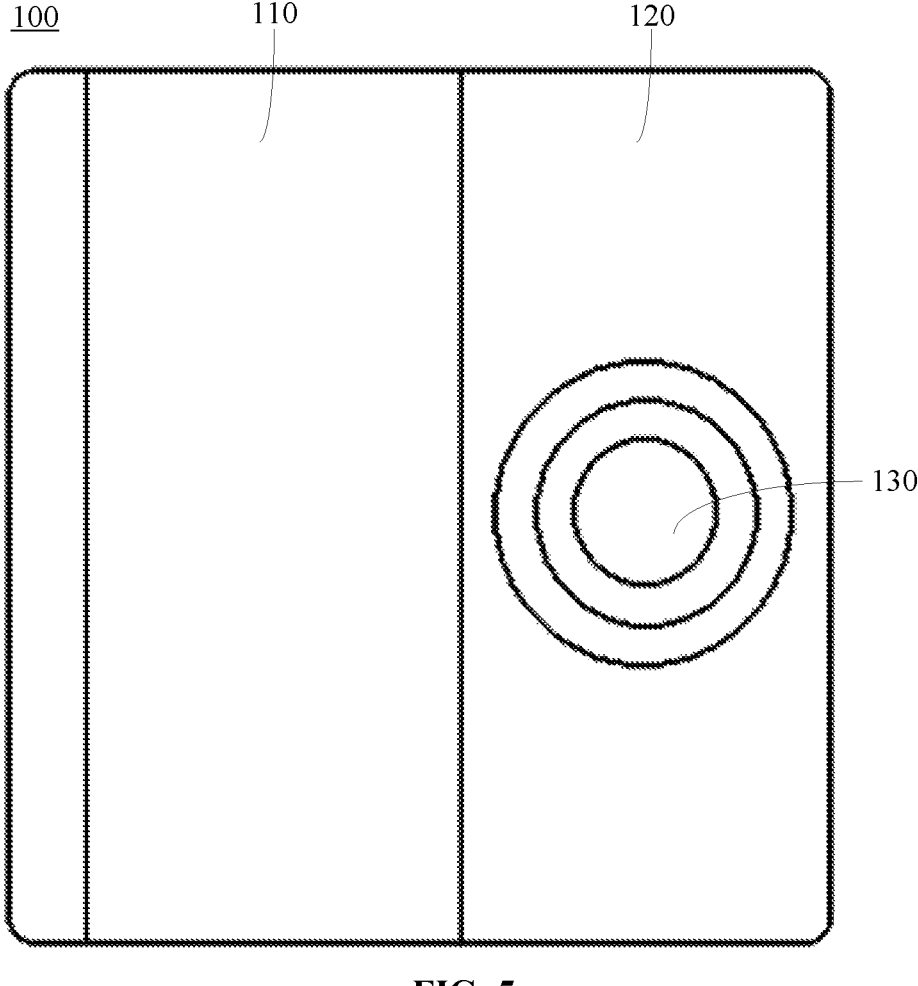
FIG. 5 is a schematic diagram of a telescopic electronic device in a second state according to an embodiment of this application.

100—telescopic electronic device, 110—body portion, 120—telescopic portion, 130—third coil, 200—wireless charging apparatus, 210—first coil, 220—second coil, 230—heat dissipation apparatus;

1200—electronic device, 1201—radio frequency unit, 1202—network module, 1203—audio output unit, 1204—input unit, 12041—graphics processing unit, 12042—microphone, 1205—sensor, 1206—display unit, 12061—display panel, 1207—user input unit, 12071—touch panel, 12072—another input device, 1208—interface unit, 1209—memory, 1210—processor, 1211—power supply.

DETAILED DESCRIPTION

To clearly states the objectives, technical solutions, and advantages of this application, the technical solutions of this application are clearly described below with reference to specific embodiments of this application and the accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data termed in such a way is interchangeable in proper circumstances, so that the embodiments of this application can be implemented in other sequences than the sequence illustrated or described herein. In addition, objects distinguished by "first", "second", and the like are usually of one type, and a quantity of the objects is not limited. For example, a first object may be one or more than one. In addition, "and/or" in the specification and claims represents at least one of connected objects. The character "/" generally indicates an "or" relationship between the associated objects.

The following describes the technical solutions disclosed in the embodiments of this application in detail through specific embodiments and application scenarios thereof with reference to the accompanying drawings.

Referring to FIG. 1 to FIG. 5, the embodiments of this application disclose an electronic device component. The disclosed electronic device component includes a telescopic electronic device 100 and a wireless charging apparatus 200.

The telescopic electronic device 100 includes a body portion 110, a telescopic portion 120, and a third coil 130. The body portion 110 and the telescopic portion 120 are basic components of the telescopic electronic device 100, and the body portion 110 and the telescopic portion 120 can provide a mounting basis for another component of the telescopic electronic device 100. The telescopic portion 120 is retractably arranged at the body portion 110, so that the telescopic portion 120 is retractable into or at least partially extends out of the body portion 110. In a case that the telescopic portion 120 at least partially extends out of the body portion 110, the telescopic portion 120 and the body portion 110 are generally coplanar, and a screen display area of the telescopic electronic device 100 is increased. During a use process of a user, large screen display can make a display effect of the telescopic electronic device 100 better, thereby improving user experience. In a case that the telescopic portion 120 is retracted into the body portion 110, an overall size of the telescopic electronic device 100 is small, which is convenient for a user to carry the telescopic electronic device 100, and improves portability of the telescopic electronic device 100. The third coil 130 is arranged at the telescopic portion 120, so that the third coil 130 is retractable into the body portion 110 or at least partially extends out of the body portion 110 with the telescopic portion 120.

The wireless charging apparatus 200 includes a first coil 210 and a second coil 220, and in a case that the telescopic electronic device 100 is opposite to the wireless charging apparatus 200, the telescopic electronic device 100 is configured to couple with the wireless charging apparatus 200 for charging. The telescopic electronic device 100 may implement coupling with the wireless charging apparatus 200 for charging through coupling between the third coil 130 and one of the first coil 210 and the second coil 220 for charging.

The telescopic electronic device 100 has a first state and a second state. When the telescopic electronic device 100 is in the first state, the telescopic portion 120 is retracted into the body portion 110. In this case, the third coil 130 is configured to couple with the first coil 210 for charging, and the telescopic electronic device 100 can be charged through coupling between the third coil 130 and the first coil 210 for charging. When the telescopic electronic device 100 is in the second state, the telescopic portion 120 at least partially extends out of the body portion 110. In this case, the third coil 130 is configured to couple with the second coil 220 for charging, and the telescopic electronic device 100 can be charged through coupling between the third coil 130 and the second coil 220 for charging.

In a charging process of the telescopic electronic device 100, the telescopic electronic device 100 may be charged in the first state or the second state. For example, when the telescopic electronic device 100 is charged in the first state, the first coil 210 generates heat, and the heat constantly accumulates, resulting in a case that a temperature of the first coil 210 is greater than a first preset temperature. In a case that the temperature of the first coil 210 is greater than the first preset temperature, the telescopic electronic device 100 is in the second state, that is, in a case that the temperature of the first coil 210 is greater than the first preset temperature, coupling between the first coil 210 and the third coil 130 for charging is disconnected. In this case, the first coil 210 stops charging the telescopic electronic device 100, so the first coil 210 no longer continues to generate heat, and the temperature of the first coil 210 is difficult to continue to rise. In addition, the first coil 210 dissipates heat, so that temperature of the first coil 210 gradually decreases to avoid serious heating of the first coil 210, avoid serious heating of the wireless charging apparatus 200, and further avoid excessive temperature of the telescopic electronic device 100.

In addition, the telescopic electronic device 100 is in a second state, and in this case, the telescopic electronic device 100 is charged through coupling between a third coil 130 and the second coil 220 for charging, so that the telescopic electronic device 100 continues to be charged, and a case that the telescopic electronic device 100 cannot continue to be charged due to a high temperature of the first coil 210 is avoided.

When the telescopic electronic device 100 is charged in the second state, the second coil 220 generates heat, and the heat constantly accumulates, resulting in a case that a temperature of the second coil 220 is greater than a second preset temperature. In a case that the temperature of the second coil 220 is greater than the second preset temperature, the telescopic electronic device 100 is in the first state, that is, when the temperature of the second coil 220 is greater than the second preset temperature, coupling between the second coil 220 and the third coil 130 for charging is disconnected. In this case, the second coil 220 stops charging the telescopic electronic device 100, so the second coil 220 no longer continues to generate heat, and the temperature of the second coil 220 is difficult to continue to rise. In addition, the second coil 220 dissipates heat, so that the temperature of the second coil 220 gradually decreases to avoid serious heating of the second coil 220, avoid serious heating of the wireless charging apparatus 200, and further avoid excessive temperature of the telescopic electronic device 100.

In addition, the telescopic electronic device 100 is in the first state, in this case, the telescopic electronic device 100 is charged through coupling between the third coil 130 and the first coil 210 for charging, so that the telescopic electronic device 100 continues to be charged, and a case that the telescopic electronic device 100 cannot continue to be charged due to a high temperature of the second coil 220 is avoided.

It needs to be noted that, the first preset temperature may be 60° C., 70° C., or 80° C., and certainly, the first preset temperature may further be another temperature value. Similarly, the second preset temperature may also be 60° C., 70° C., or 80° C., and certainly, the second preset temperature may further be another temperature value. Specific temperature values of the first preset temperature and the second preset temperature are not limited in the embodiments of this application.

In the electronic device component disclosed in the embodiments of this application, on-off of a first coil 210 and a second coil 220 is controlled by detecting temperatures of the first coil 210 and the second coil 220, so that the first coil 210 stops charging a telescopic electronic device 100 in a case that the temperature of the first coil 210 is greater than a first preset temperature, and the first coil 210 no longer continues to generate heat, or the second coil 220 stops charging the telescopic electronic device 100 when the temperature of the second coil 220 is greater than a second preset temperature, and the second coil 220 no longer continues to generate heat. Therefore, it is difficult for the temperatures of the first coil 210 and the second coil 220 to continue to rise during a charging process of the telescopic electronic device 100, and heat of the first coil 210 and the second coil 220 can be dissipated, so that the temperatures of the first coil 210 and the second coil 220 are gradually reduced, serious heating of the first coil 210 and the second coil 220 is avoided, serious heating of a wireless charging apparatus 200 is avoided, serious heating of the telescopic electronic device 100 in a wireless charging process is avoided, and user experience is finally improved.

In addition, in a case that the temperature of the first coil 210 is greater than the first preset temperature, the telescopic electronic device 100 is in a second state, and in this case, the telescopic electronic device 100 is charged through coupling between a third coil 130 and the second coil 220 for charging, so that the telescopic electronic device 100 can continue to be charged, and a case that the telescopic electronic device 100 cannot continue to be charged due to a high temperature of the first coil 210 is avoided. In a case that the temperature of the second coil 220 is greater than the second preset temperature, the telescopic electronic device 100 is in a first state, in this case, the telescopic electronic device 100 is charged through coupling between the third coil 130 and the first coil 210 for charging, so that the telescopic electronic device 100 can continue to be charged, and a case that the telescopic electronic device 100 cannot continue to be charged due to a high temperature of the second coil 220 is avoided.

To quickly dissipate heat of the telescopic electronic device 100, in an optional embodiment, the wireless charging apparatus 200 may further include a heat dissipation apparatus 230, and the heat dissipation apparatus 230 may be arranged on a body of the wireless charging apparatus 200. In a case that the telescopic electronic device 100 is opposite to the wireless charging apparatus 200, the heat dissipation apparatus 230 may be located at a side of the telescopic electronic device 100 and faces at least one of the body portion 110 and the telescopic portion 120. The heat dissipation apparatus 230 can achieve an effect of forced heat dissipation, so that heat of the telescopic electronic device 100 can be dissipated quickly, and a case that the temperature of the telescopic electronic device 100 is high because the heat of the telescopic electronic device 100 is difficult to be dissipated is avoided, thereby preventing the telescopic electronic device 100 from heating seriously. The heat dissipation apparatus 230 may typically be an air box or a fan.

As described above, the telescopic portion 120 may be retracted into or at least partially extend out of the body portion 110, and a user may manually drive the telescopic portion 120 to move retractably relative to the body portion 110. Optionally, the telescopic electronic device 100 may further include a drive mechanism, the drive mechanism may be arranged at the body portion 110, and the drive mechanism is connected to the telescopic portion 120 in a driving manner. The drive mechanism can drive the telescopic portion 120 to retract within the body portion 110 or at least partially extend out of the body portion 110. Compared with a manual driving mode, the drive mechanism has higher precision when driving the telescopic portion 120 to move, and enables the telescopic electronic device 100 to automatically switch between the first state and the second state, which is convenient for a user to use the telescopic electronic device 100.

In a charging process of the telescopic electronic device 100, in a case that the temperature of the first coil 210 is greater than the first preset temperature, the drive mechanism drives the telescopic portion 120 to at least partially extend out of the body portion 110; and in a case that the temperature of the second coil 220 is greater than the second preset temperature, the drive mechanism drives the telescopic portion 120 to retract into the body portion 110. In this case, an entire process can be completed automatically by the telescopic electronic device 100 without participation of the user, thereby improving convenience of using the telescopic electronic device 100 and further improving user experience.

Optionally, in a case that the temperature of the first coil 210 is greater than the first preset temperature, the first coil 210 may be in a power-off state, thereby avoiding a case that the first coil 210 still charges the telescopic electronic device 100 because the first coil 210 is still configured to couple with the third coil 130 for charging, and further improving reliability that the telescopic electronic device 100 switches a charging state. Certainly, in a case that the temperature of the second coil 220 is greater than the second preset temperature, the second coil 220 may be in the power-off state, thereby avoiding a case that the second coil 220 still charges the telescopic electronic device 100 because the second coil 220 is still configured to couple with the third coil 130 for charging, and further improving reliability that the telescopic electronic device 100 switches the charging state.

Based on the electronic device component disclosed in the embodiments of this application, the embodiments of this application further disclose a control method of an electronic device component. The electronic device component includes a telescopic electronic device 100 and a wireless charging apparatus 200, the wireless charging apparatus 200 includes a first coil 210 and a second coil 220, the telescopic electronic device 100 includes a body portion 110, a telescopic portion 120, and a third coil 130, the third coil 130 is arranged in the telescopic portion 120, and the telescopic portion 120 is retractable into or at least partially extends out of the body portion 110. In a case that the telescopic electronic device 100 is opposite to the wireless charging apparatus 200, one of the first coil 210 and the second coil 220 is configured to couple with the third coil 130 for charging. When the telescopic electronic device 100 is in a first state, the telescopic portion 120 is retracted into the body portion 110, and the third coil 130 is configured to couple with the first coil 210 for charging. When the telescopic electronic device 100 is in a second state, the telescopic portion 120 at least partially extends out of the body portion 110, and the third coil 130 is configured to couple with the second coil 220 for charging.

The disclosed control method includes the following steps.

Step 101. Detect a first temperature of the first coil 210 and a second temperature of the second coil 220 respectively.

Step 102. Control the telescopic electronic device 100 to be in the second state when the first temperature is greater than a first preset temperature.

When the telescopic electronic device 100 is charged in the first state, the first coil 210 generates heat, and the heat constantly accumulates, resulting in a case that a temperature of the first coil 210 is greater than the first preset temperature. In a case that the temperature of the first coil 210 is greater than the first preset temperature, the telescopic electronic device 100 is in the second state, that is, in a case that the temperature of the first coil 210 is greater than the first preset temperature, coupling between the first coil 210 and the third coil 130 for charging is disconnected. In this case, the first coil 210 stops charging the telescopic electronic device 100, so the first coil 210 no longer continues to generate heat, and the temperature of the first coil 210 is difficult to continue to rise. In addition, the first coil 210 dissipates heat, so that the temperature of the first coil 210 gradually decreases to avoid serious heating of the first coil 210, avoid serious heating of the wireless charging apparatus 200, and further avoid excessive temperature of the telescopic electronic device 100.

In addition, the telescopic electronic device 100 is in a second state, and in this case, the telescopic electronic device 100 is charged through coupling between a third coil 130 and the second coil 220 for charging, so that the telescopic electronic device 100 continues to be charged, and a case that the telescopic electronic device 100 cannot continue to be charged due to a high temperature of the first coil 210 is avoided.

Step 103. Control the telescopic electronic device 100 to be in the first state when the second temperature is greater than a second preset temperature.

When the telescopic electronic device 100 is charged in the second state, the second coil 220 generates heat and the heat constantly accumulates, causing the temperature of the second coil 220 to be greater than the second preset temperature. In a case that the temperature of the second coil 220 is greater than the second preset temperature, the telescopic electronic device 100 is in the first state. That is, in a case that the temperature of the second coil 220 is greater than the second preset temperature, coupling between the second coil 220 and the third coil 130 for charging is disconnected. In this case, the second coil 220 stops charging the telescopic electronic device 100, so the second coil 220 no longer continues to generate heat, and the temperature of the second coil 220 is difficult to continue to rise. In addition, the second coil 220 dissipates heat, so that the temperature of the second coil 220 gradually decreases to avoid serious heating of the second coil 220, avoid serious heating of the wireless charging apparatus 200, and further avoid excessive temperature of the telescopic electronic device 100.

In addition, the telescopic electronic device 100 is in the first state, in this case, the telescopic electronic device 100 is charged through coupling between the third coil 130 and the first coil 210 for charging, so that the telescopic electronic device 100 continues to be charged, and a case that the telescopic electronic device 100 cannot continue to be charged due to a high temperature of the second coil 220 is avoided.

According to the foregoing control method, when the telescopic electronic device 100 is in the first state or the second state, the electronic device component can be controlled to control on-off of the first coil 210 and the second coil 220 by detecting temperatures of the first coil 210 and the second coil 220, so that the first coil 210 stops charging a telescopic electronic device 100 in a case that the temperature of the first coil 210 is greater than a first preset temperature, and the first coil 210 no longer continues to generate heat, or the second coil 220 stops charging the telescopic electronic device 100 when the temperature of the second coil 220 is greater than a second preset temperature, and the second coil 220 no longer continues to generate heat. Therefore, it is difficult for the temperatures of the first coil 210 and the second coil 220 to continue to rise during a charging process of the telescopic electronic device 100, and heat of the first coil 210 and the second coil 220 can be dissipated, so that the temperatures of the first coil 210 and the second coil 220 are gradually reduced, serious heating of the first coil 210 and the second coil 220 is avoided, serious heating of a wireless charging apparatus 200 is avoided, serious heating of the telescopic electronic device 100 in a wireless charging process is avoided, and user experience is finally improved.

Optionally, step 102 may include the following steps. Step 201. Control the telescopic electronic device 100 to be in the second state, and control the first coil 210 to be in a power-off state, thereby avoiding a case that the first coil 210 still charges the telescopic electronic device 100 because the first coil 210 is still configured to couple with the third coil 130 for charging, and further improving reliability that the telescopic electronic device 100 switches a charging state.

Step 103 may include the following steps. Step 202. Control the telescopic electronic device 100 to be in the first state, and control the second coil 220 to be in the power-off state, thereby avoiding a case that the second coil 220 still charges the telescopic electronic device 100 because the second coil 220 is still configured to couple with the third coil 130 for charging, and further improving reliability that the telescopic electronic device 100 switches the charging state.

In order to dissipate heat of the telescopic electronic device 100 more quickly, in an optional embodiment, the wireless charging apparatus 200 may further include a heat dissipation apparatus 230, the heat dissipation apparatus 230 is arranged on a body of the wireless charging apparatus 200, in a case that the telescopic electronic device 100 is opposite to the wireless charging apparatus 200, the heat dissipation apparatus 230 is located at a side of the telescopic electronic device 100 and faces at least one of the body portion 110 and the telescopic portion 120, and the control method may further include:

Step 301. Control the heat dissipation apparatus 230 to be in an operating state when the first temperature is greater than the first preset temperature, or the second temperature is greater than the second preset temperature.

The heat dissipation apparatus 230 can achieve an effect of forced heat dissipation. In step 301, the heat dissipation apparatus 230 can achieve the effect of forced heat dissipation, so that heat of the telescopic electronic device 100 can be dissipated quickly, and a case that the temperature of the telescopic electronic device 100 is high because the heat of the telescopic electronic device 100 is difficult to be dissipated is avoided, thereby preventing the telescopic electronic device 100 from heating seriously. The heat dissipation apparatus 230 may typically be an air box or a fan. Heat of the telescopic electronic device 100 can be dissipated quickly, which avoids a case that the temperature of the telescopic electronic device 100 is high because the heat of the telescopic electronic device 100 is difficult to be dissipated, and prevents the telescopic electronic device 100 from heating seriously.

In order to enable the telescopic portion 120 to automatically move retractably relative to the body portion 110, the telescopic electronic device 100 may further include a drive mechanism, the drive mechanism may be arranged at the body portion 110, the drive mechanism is connected to the telescopic portion 120 in a driving manner, and step 102 may include: Step 401. Control the drive mechanism to drive the telescopic portion 120 to at least partially extend out of the body portion 110.

Step 102 may include: Step 402. Control the drive mechanism to drive the telescopic portion 120 to retract into the body portion 110.

The control method enables the telescopic electronic device 100 to automatically complete a whole charging process without participation of the user, thereby improving convenience of using the telescopic electronic device 100 and further improving user experience.

After charging of the telescopic electronic device 100 is completed, optionally, the control method may further include the following steps.

Step 501. Detect a battery level of the telescopic electronic device 100.

Step 502. Control, when the battery level is greater than or equal to a preset battery level, the first coil 210, the second coil 220, and the third coil 130 to be in the power-off state.

After charging of the telescopic electronic device 100 is completed, the first coil 210, the second coil 220, and the third coil 130 are all in the power-off state, so that the telescopic electronic device 100 and the wireless charging apparatus 200 are all in a non-charging state. In this case, the wireless charging apparatus 200 cannot charge the telescopic electronic device 100 through the first coil 210 or the second coil 220, it is difficult for temperatures of the wireless charging apparatus 200 and the telescopic electronic device 100 to continue to rise, and the wireless charging apparatus 200 and the telescopic electronic device 100 dissipate heat, so that the temperatures of the wireless charging apparatus 200 and the telescopic electronic device 100 gradually decrease, thus preventing the wireless charging apparatus 200 and the telescopic electronic device 100 from heating seriously and preventing the temperature of the telescopic electronic device 100 from being too high.

The electronic device component disclosed in the embodiments of this application can implement each process implemented by the electronic device component in the foregoing method embodiments. To avoid repetition, details are not described herein again.

The embodiments of this application further disclose a control apparatus of an electronic device. The electronic device is a telescopic electronic device 100. The telescopic electronic device 100 includes a body portion 110, a telescopic portion 120, and a third coil 130, the third coil 130 is arranged in the telescopic portion 120, and the telescopic portion 120 is retractable into or at least partially extends out of the body portion 110. The telescopic electronic device 100 is configured to couple with a wireless charging apparatus 200 for charging, and the wireless charging apparatus 200 includes a first coil 210 and a second coil 220. In a case that the telescopic electronic device 100 is opposite to the wireless charging apparatus 200, one of the first coil 210 and the second coil 220 is configured to couple with the third coil 130 for charging. When the telescopic electronic device 100 is in a first state, the telescopic portion 120 is retracted into the body portion 110, and the third coil 130 is configured to couple with the first coil 210 for charging. When the telescopic electronic device 100 is in a second state, the telescopic portion 120 at least partially extends out of the body portion 110, and the third coil 130 is configured to couple with the second coil 220 for charging. The disclosed control apparatus includes: a first detection module, configured to detect a first temperature of the first coil 210 and a second temperature of the second coil 220 respectively; a first control module, configured to control the telescopic electronic device 100 to be in the second state when the first temperature is greater than a first preset temperature; and a second control module, configured to control the telescopic electronic device 100 to be in the first state when the second temperature is greater than a second preset temperature.

According to the foregoing control apparatus, when the telescopic electronic device 100 is in the first state or the second state, the electronic device component can be controlled to control on-off of the first coil 210 and the second coil 220 by detecting temperatures of the first coil 210 and the second coil 220, so that the first coil 210 stops charging a telescopic electronic device 100 in a case that the temperature of the first coil 210 is greater than a first preset temperature, and the first coil 210 no longer continues to generate heat, or the second coil 220 stops charging the telescopic electronic device 100 when the temperature of the second coil 220 is greater than a second preset temperature, and the second coil 220 no longer continues to generate heat. Therefore, it is difficult for the temperatures of the first coil 210 and the second coil 220 to continue to rise during a charging process of the telescopic electronic device 100, and heat of the first coil 210 and the second coil 220 can be dissipated, so that the temperatures of the first coil 210 and the second coil 220 are gradually reduced, serious heating of the first coil 210 and the second coil 220 is avoided, serious heating of a wireless charging apparatus 200 is avoided, serious heating of the telescopic electronic device 100 in a wireless charging process is avoided, and user experience is finally improved.

Optionally, the first control module may include: a first control unit, configured to control the telescopic electronic device 100 to be in the second state when the first temperature is greater than the first preset temperature; and a second control unit, configured to control the first coil 210 to be in a power-off state when the first temperature is greater than the first preset temperature, thereby avoiding a case that the first coil 210 still charges the telescopic electronic device 100 because the first coil 210 is still configured to couple with the third coil 130 for charging, and further improving reliability that the telescopic electronic device 100 switches a charging state.

The second control module may include: a third control unit, configured to control the telescopic electronic device 100 to be in the first state when the second temperature is greater than the second preset temperature; and a fourth control unit, configured to control the second coil 220 to be in the power-off state when the second temperature is greater than the second preset temperature, thereby avoiding a case that the second coil 220 still charges the telescopic electronic device 100 because the second coil 220 is still configured to couple with the third coil 130 for charging, and further improving reliability that the telescopic electronic device 100 switches a charging state.

In order to dissipate heat of the telescopic electronic device 100 more quickly, in an optional embodiment, the wireless charging apparatus 200 may further include a heat dissipation apparatus 230, the heat dissipation apparatus 230 is arranged on a body of the wireless charging apparatus 200, in a case that the telescopic electronic device 100 is opposite to the wireless charging apparatus 200, the heat dissipation apparatus 230 is located at a side of the telescopic electronic device 100 and faces at least one of the body portion 110 and the telescopic portion 120, and the control apparatus may further include: a third control module, configured to control the heat dissipation apparatus 230 to be in an operating state when the first temperature is greater than the first preset temperature, or the second temperature is greater than the second preset temperature.

The heat dissipation apparatus 230 can achieve an effect of forced heat dissipation. In step 301, the heat dissipation apparatus 230 can achieve the effect of forced heat dissipation, so that heat of the telescopic electronic device 100 can be dissipated quickly, and a case that the temperature of the telescopic electronic device 100 is high because the heat of the telescopic electronic device 100 is difficult to be dissipated is avoided, thereby preventing the telescopic electronic device 100 from heating seriously. The heat dissipation apparatus 230 may typically be an air box or a fan. Heat of the telescopic electronic device 100 can be dissipated quickly, which avoids a case that the temperature of the telescopic electronic device 100 is high because the heat of the telescopic electronic device 100 is difficult to be dissipated, and prevents the telescopic electronic device 100 from heating seriously.

In order to enable the telescopic portion 120 to automatically move retractably relative to the body portion 110, the telescopic electronic device 100 may further include a drive mechanism, the drive mechanism may be arranged at the body portion 110, the drive mechanism is connected to the telescopic portion 120 in a driving manner, and the first control module may include: a fifth control unit, configured to control the drive mechanism to drive the telescopic portion 120 to at least partially extend out of the body portion 110 when the first temperature is greater than the first preset temperature. The second control module may include: a sixth control unit, configured to control the drive mechanism to drive the telescopic portion 120 to retract into the body portion 110 when the second temperature is greater than the second preset temperature.

The control apparatus enables the telescopic electronic device 100 to automatically complete a whole charging process without participation of the user, thereby improving convenience of using the telescopic electronic device 100 and further improving user experience.

After charging of the telescopic electronic device 100 is completed, optionally, the control apparatus may further include: a second detection module, configured to detect a battery level of the telescopic electronic device 100; and a fourth control module, configured to control, when the battery level is greater than or equal to a preset battery level, the first coil 210, the second coil 220, and the third coil 130 to be in the power-off state.

After charging of the telescopic electronic device 100 is completed, the first coil 210, the second coil 220, and the third coil 130 are all in the power-off state, so that the telescopic electronic device 100 and the wireless charging apparatus 200 are all in a non-charging state. In this case, the wireless charging apparatus 200 cannot charge the telescopic electronic device 100 through the first coil 210 or the second coil 220, it is difficult for temperatures of the wireless charging apparatus 200 and the telescopic electronic device 100 to continue to rise, and the wireless charging apparatus 200 and the telescopic electronic device 100 dissipate heat, so that the temperatures of the wireless charging apparatus 200 and the telescopic electronic device 100 gradually decrease, thus preventing the wireless charging apparatus 200 and the telescopic electronic device 100 from heating seriously and preventing the temperature of the telescopic electronic device 100 from being too high.

Figure 6:
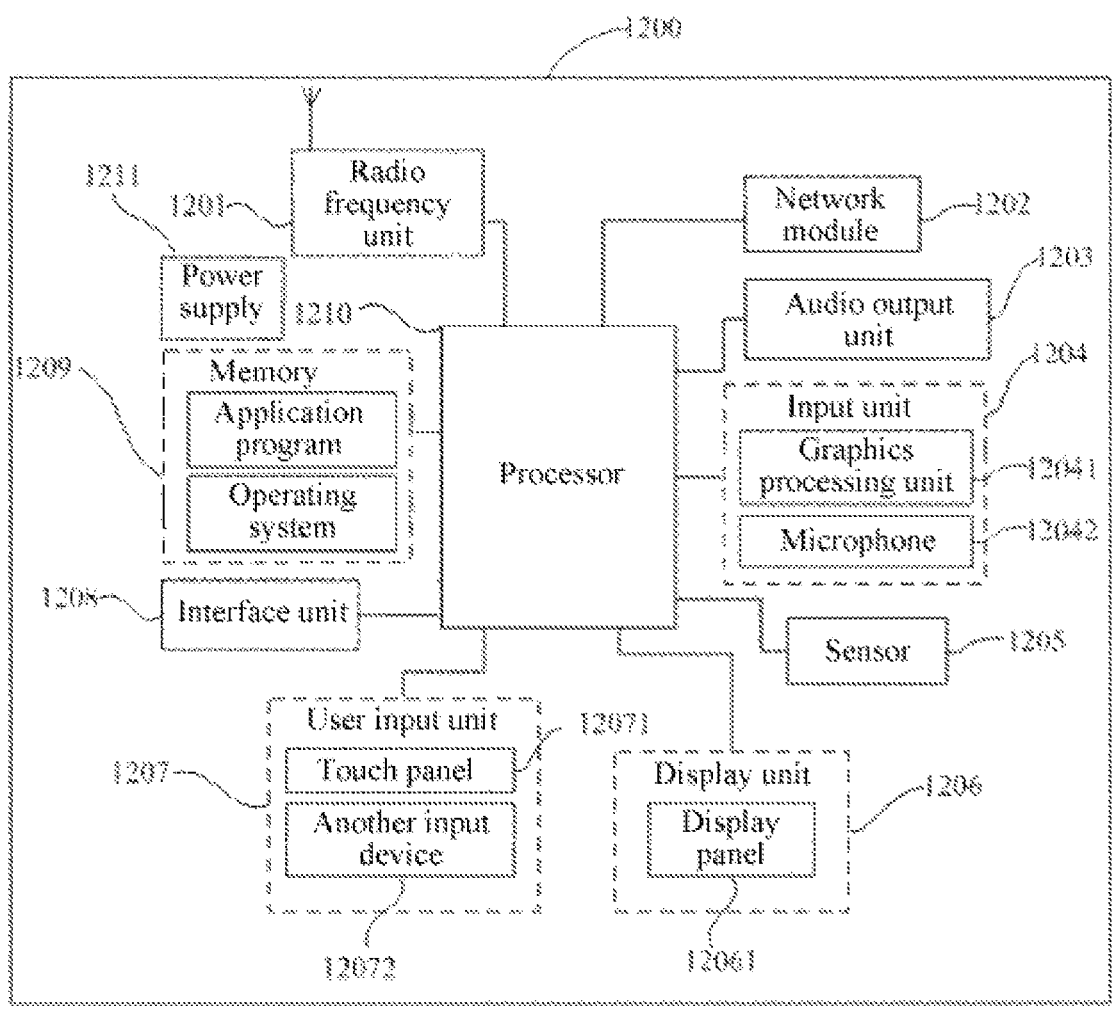
FIG. 6 is a schematic diagram of an electronic device.

FIG. 6 is a schematic diagram of a hardware structure of an electronic device that implements each embodiment of this application.

The electronic device 1200 includes, but is not limited to: components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the electronic device shown in FIG. 6 constitutes no limitation on the electronic device, and the electronic device may include more or fewer components than those shown in the figure, or some components may be combined, or a different component deployment may be used. In this embodiment of this application, the electronic device includes, but is not limited to, a mobile phone, a tablet computer, a notebook computer, a palmtop computer, an in-vehicle terminal, a wearable device, a pedometer, and the like.

The sensor 1205 is configured to detect a first temperature of the first coil 210 and a second temperature of the second coil 220 respectively. When the first temperature is greater than a first preset temperature value, the processor 1210 controls the telescopic electronic device 100 to be in a second state, and when the second temperature is greater than a second preset temperature value, the processor 1210 controls the telescopic electronic device 100 to be in a first state.

On-off of the first coil 210 and the second coil 220 is controlled by detecting temperatures of a first coil 210 and a second coil 220, so that the first coil 210 stops charging a telescopic electronic device 100 in a case that the temperature of the first coil 210 is greater than a first preset temperature, and the first coil 210 no longer continues to generate heat, or the second coil 220 stops charging the telescopic electronic device 100 when the temperature of the second coil 220 is greater than a second preset temperature, and the second coil 220 no longer continues to generate heat. Therefore, it is difficult for the temperatures of the first coil 210 and the second coil 220 to continue to rise during a charging process of the telescopic electronic device 100, and heat of the first coil 210 and the second coil 220 can be dissipated, so that the temperatures of the first coil 210 and the second coil 220 are gradually reduced, serious heating of the first coil 210 and the second coil 220 is avoided, serious heating of a wireless charging apparatus 200 is avoided, serious heating of the telescopic electronic device 100 in a wireless charging process is avoided, and user experience is finally improved.

It should be understood that, in this embodiment of this application, the radio frequency unit 1201 may be configured to receive and transmit information or receive and transmit a signal during a call. Specifically, the radio frequency unit 1201 is configured to receive downlink data from a base station and transmit downlink data to the processor 1210 for processing. In addition, the radio frequency unit transmits uplink data to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may further communicate with another device through a wireless communication system and a network.

The electronic device provides wireless broadband Internet access for a user by using the network module 1202, for example, allowing the user to send and receive emails, browse webpages, access streaming media content, and the like.

The audio output unit 1203 may convert audio data received by the radio frequency unit 1201 or the network module 1202 or stored on the memory 1209 into audio signals and output the audio signals as sounds. In addition, the audio output unit 1203 may further provide audio output (for example, a call signal reception sound or a message reception sound) related to a specific function performed by the electronic device 1200. The audio output unit 1203 includes a speaker, a buzzer, a receiver, and the like The input unit 1204 is configured to receive an audio or video signal. The input unit 1204 may include a graphics processing unit (GPU) 12041 and a microphone 12042. The graphics processing unit 12041 performs processing on image data of a static picture or a video acquired by an image acquisition apparatus (for example, a camera) in a video acquisition mode or an image acquisition mode. The processed image frame can be displayed on the display unit 1206. An image frame processed by the graphics processing unit 12041 may be stored in the memory 1209 (or another storage medium) or sent by using the radio frequency unit 1201 or the network module 1202. The microphone 12042 may receive a sound and can process such a sound into audio data. The processed audio data may be converted, in a phone call mode, into a format that may be sent by the radio frequency unit 1201 to a mobile communication base station.

The electronic device 1200 further includes at least one sensor 1205 such as an optical sensor, a motion sensor, or another sensor. Specifically, the optical sensor includes an ambient light sensor and a proximity sensor. The ambient light sensor may adjust luminance of a display panel 12061 according to brightness of the ambient light. The proximity sensor may switch off the display panel 12061 and/or backlight when the electronic device 1200 is moved to the ear. As a type of motion sensor, an acceleration sensor can detect magnitudes of accelerations in various directions (generally, on three axes), may detect a magnitude and a direction of the gravity in a static state, and may be applied to recognizing an altitude of the electronic device (for example, switching between a landscape state and a portrait state, a related game, and magnetometer attitude calibration), a function related to vibration recognition (such as a pedometer and a knock), and the like. The sensor 1205 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 1206 is configured to display information inputted by the user or information provided for the user. The display unit 1206 may include a display panel 12061. The display panel 12061 may be configured in the form of a liquid crystal display (LCD), an organic light-emitting diode (OLED), or the like.

The user input unit 1207 may be configured to receive input digit or character information, and generate a keyboard signal input related to the user setting and function control of the electronic device. Specifically, the user input unit 1207 includes a touch panel 12071 and another input device 12072. The touch panel 12071, also referred to as a touchscreen, may collect a touch operation of a user on or near the touch panel (such as an operation of a user on or near the touch panel 12071 by using any suitable object or attachment, such as a finger or a touch pen). The touch panel 12071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 1210. In addition, the touch controller receives a command transmitted by the processor 1210 and executes the command. In addition, the touch panel 12071 may be implemented by using various types, such as a resistive type, a capacitance type, an infrared type, and a surface acoustic wave type. In addition to the touch panel 12071, the user input unit 1207 may further include the another input device 12072. Specifically, the another input device 12072 may include, but is not limited to, a physical keyboard, a functional key (for example, a volume control key or a switch key), a track ball, a mouse, and a joystick, and the details will not be described herein again.

Further, the touch panel 12071 may cover the display panel 12061. After detecting a touch operation on or near the touch panel, the touch panel 12071 transfers the touch operation to the processor 1210, to determine a type of a touch event. Then, the processor 1210 provides a corresponding visual output on the display panel 12061 according to the type of the touch event. In FIG. 6, the touch panel 12071 and the display panel 12061 implement, as two independent parts, input and output functions of the electronic device. However, in some embodiments, the touch panel 12071 and the display panel 12061 may be integrated to implement the input and output functions of the electronic device. The details are not limited herein.

The interface unit 1208 is an interface for connecting an external apparatus and the electronic device 1200. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 1208 may be configured to receive an input (for example, data information or electricity) from an external apparatus and transmit the received input to one or more elements in the electronic device 1200, or may be configured to transmit data between the electronic device 1200 and the external apparatus.

The memory 1209 may be configured to store a software program and various data. The memory 1209 may mainly include a program storage area and a data storage area. The program storage area may store an operating system, an application required by at least one function (for example, a sound playback function and an image display function), and the like. The data storage area may store data (for example, audio data and a telephone book) and the like created according to use of the electronic device. In addition, the memory 1209 may include a high speed random access memory, and may further include a non-volatile memory, such as at least one magnetic disk storage device, a flash memory, or another non-volatile solid state storage device.

The processor 1210 is a control center of the electronic device, and connects to various parts of the electronic device by using various interfaces and lines. By running or executing the software program and/or module stored in the memory 1209, and invoking data stored in the memory 1209, the processor performs various functions and data processing of the electronic device, thereby performing overall monitoring on the electronic device. Optionally, the processor 1210 may include one or more processing units. Optionally, the processor 1210 may integrate an application processor and a modem processor. The application processor mainly processes an operating system, a user interface, an application, and the like. The modem processor mainly processes wireless communication. It may be understood that the modem processor may alternatively not be integrated into the processor 1210.

The electronic device 1200 may further include the power supply 1211 (for example, a battery) for supplying power to the components. Optionally, the power supply 1211 may be logically connected to the processor 1210 by a power management system, thereby implementing functions such as charging, discharging, and power consumption management by using the power management system.

In addition, the electronic device 1200 includes some functional module that are not shown, which are not described herein in detail.

Optionally, the embodiments of this application further disclose a terminal device. The terminal device includes a processor 1210, a memory 1209, and a program or an instruction stored in the memory 1209 and executable on the processor 1210. When the program or instruction is executed by the processor 1210, processes of the foregoing any method embodiments are implemented, and a same technical effect can be achieved. To avoid repetition, details are not described herein again.

The electronic device disclosed in the embodiments of this application may be a smart phone, a tablet computer, an e-book reader, a wearable device (such as a smart watch), a video game console, and the like. The embodiments of this application do not limit a specific type of the electronic device.

The embodiments of this application further disclose a readable storage medium storing a program or an instruction. The program or instruction is executed by a processor to implement processes of the foregoing any method embodiments, and the same technical effects can be achieved. To avoid repetition, details are not described herein again. The readable storage medium is, for example, a read-only memory (ROM), a random access memory (RAM), a magnetic disk, or an optical disc.

The embodiments of this application further disclose an apparatus, and the apparatus is configured to perform the control method according to the foregoing embodiments.

The embodiments of this application further provide a chip. The chip includes a processor and a communication interface, the communication interface is coupled with the processor, and the processor is configured to execute a program or an instruction to implement the control method according to the foregoing embodiments.

The embodiments of this application further provide a computer program product. The computer program product is stored in a non-volatile storage medium, and the program product is configured to be executed by at least one processor to implement steps of the control method in the foregoing embodiments.

It needs to be noted that, terms "include", "include", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the embodiments of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the methods according to the embodiments of this application.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An electronic device system, comprising a telescopic electronic device and a wireless charging apparatus, wherein the wireless charging apparatus comprises a first coil and a second coil, the telescopic electronic device comprises a body portion, a telescopic portion, and a third coil, the third coil is arranged in the telescopic portion, and the telescopic portion is retractable into or at least partially extends out of the body portion;

in a case that the telescopic electronic device is opposite to the wireless charging apparatus, one of the first coil and the second coil is configured to couple with the third coil for charging;

when the telescopic electronic device is in a first state, the telescopic portion is retracted into the body portion, and the third coil is configured to couple with the first coil for charging;

when the telescopic electronic device is in a second state, the telescopic portion at least partially extends out of the body portion, and the third coil is configured to couple with the second coil for charging;

in a case that a temperature of the first coil is greater than a first preset temperature, the telescopic electronic device is in the second state; and in a case that a temperature of the second coil is greater than a second preset temperature, the telescopic electronic device is in the first state.

2. The electronic device system according to claim 1, wherein the wireless charging apparatus further comprises a heat dissipation apparatus, and the heat dissipation apparatus is arranged on a body of the wireless charging apparatus; and in a case that the telescopic electronic device is opposite to the wireless charging apparatus, the heat dissipation apparatus is located at a side of the telescopic electronic device and faces at least one of the body portion and the telescopic portion.

3. The electronic device system according to claim 1, wherein the telescopic electronic device further comprises a drive mechanism, the drive mechanism is arranged at the body portion, and the drive mechanism is connected to the telescopic portion in a driving manner;

in a case that the temperature of the first coil is greater than the first preset temperature, the drive mechanism drives the telescopic portion to at least partially extend out of the body portion; and in a case that the temperature of the second coil is greater than the second preset temperature, the drive mechanism drives the telescopic portion to retract into the body portion.

4. The electronic device system according to claim 1, wherein the first coil is in a power-off state when the temperature of the first coil is greater than the first preset temperature; and the second coil is in the power-off state in a case that the temperature of the second coil is greater than the second preset temperature.

5. A control method of an electronic device system, the electronic device system comprising a telescopic electronic device and a wireless charging apparatus, wherein the wireless charging apparatus comprises a first coil and a second coil, the telescopic electronic device comprises a body portion, a telescopic portion, and a third coil, the third coil is arranged in the telescopic portion, and the telescopic portion is retractable into or at least partially extends out of the body portion;

in a case that the telescopic electronic device is opposite to the wireless charging apparatus, one of the first coil and the second coil is configured to couple with the third coil for charging;

when the telescopic electronic device is in a first state, the telescopic portion is retracted into the body portion, and the third coil is configured to couple with the first coil for charging; and when the telescopic electronic device is in a second state, the telescopic portion at least partially extends out of the body portion, and the third coil is configured to couple with the second coil for charging; and the control method comprising:

detecting a first temperature of the first coil and a second temperature of the second coil respectively;

controlling the telescopic electronic device to be in the second state when the first temperature is greater than a first preset temperature; and controlling the telescopic electronic device to be in the first state when the second temperature is greater than a second preset temperature.

6. The control method according to claim 5, wherein the controlling the telescopic electronic device to be in the second state comprises:

controlling the telescopic electronic device to be in the second state, and controlling the first coil to be in a power-off state; and the controlling the telescopic electronic device to be in the first state comprises:

controlling the telescopic electronic device to be in the first state, and controlling the second coil to be in the power-off state.

7. The control method according to claim 5, wherein the wireless charging apparatus further comprises a heat dissipation apparatus, the heat dissipation apparatus is arranged on a body of the wireless charging apparatus, in a case that the telescopic electronic device is opposite to the wireless charging apparatus, the heat dissipation apparatus is located at a side of the telescopic electronic device and faces at least one of the body portion and the telescopic portion, and the control method further comprises:

controlling the heat dissipation apparatus to be in an operating state when the first temperature is greater than the first preset temperature, or the second temperature is greater than the second preset temperature.

8. The control method according to claim 5, wherein the telescopic electronic device further comprises a drive mechanism, the drive mechanism is arranged at the body portion, and the drive mechanism is connected to the telescopic portion in a driving manner, and the controlling the telescopic electronic device to be in the second state comprises:

controlling the drive mechanism to drive the telescopic portion to at least partially extend out of the body portion; and the controlling the telescopic electronic device to be in the first state comprises:

controlling the drive mechanism to drive the telescopic portion to retract into the body portion.

9. The control method according to claim 5, further comprising:

detecting a battery level of the telescopic electronic device; and controlling, when the battery level is greater than or equal to a preset battery level, the first coil, the second coil, and the third coil to be in the power-off state.

10. A control apparatus of an electronic device, the electronic device being a telescopic electronic device, wherein the telescopic electronic device comprises a body portion, a telescopic portion, and a third coil, the third coil is arranged in the telescopic portion, and the telescopic portion is retractable into or at least partially extends out of the body portion;

the telescopic electronic device is configured to couple with a wireless charging apparatus for charging, the wireless charging apparatus comprising a first coil and a second coil;

in a case that the telescopic electronic device is opposite to the wireless charging apparatus, one of the first coil and the second coil is configured to couple with the third coil for charging;

when the telescopic electronic device is in a first state, the telescopic portion is retracted into the body portion, and the third coil is configured to couple with the first coil for charging;

when the telescopic electronic device is in a second state, the telescopic portion at least partially extends out of the body portion, and the third coil is configured to couple with the second coil for charging; the control apparatus comprising:

a first detection module, configured to detect a first temperature of the first coil and a second temperature of the second coil respectively;

a first control module, configured to control the telescopic electronic device to be in the second state when the first temperature is greater than a first preset temperature; and a second control module, configured to control the telescopic electronic device to be in the first state when the second temperature is greater than a second preset temperature.

11. The control apparatus according to claim 10, wherein the first control module comprises:

a first control unit, configured to control the telescopic electronic device to be in the second state when the first temperature is greater than the first preset temperature; and a second control unit, configured to control the first coil to be in a power-off state when the first temperature is greater than the first preset temperature; and the second control module comprises:

a third control unit, configured to control the telescopic electronic device to be in the first state when the second temperature is greater than the second preset temperature; and a fourth control unit, configured to control the second coil to be in the power-off state when the second temperature is greater than the second preset temperature.

12. The control apparatus according to claim 10, wherein the wireless charging apparatus further comprises a heat dissipation apparatus, the heat dissipation apparatus is arranged on a body of the wireless charging apparatus, in a case that the telescopic electronic device is opposite to the wireless charging apparatus, the heat dissipation apparatus is located at a side of the telescopic electronic device and faces at least one of the body portion and the telescopic portion, and the control apparatus further comprises:

a third control module, configured to control the heat dissipation apparatus to be in an operating state when the first temperature is greater than the first preset temperature, or the second temperature is greater than the second preset temperature.

13. The control apparatus according to claim 10, wherein the telescopic electronic device further comprises a drive mechanism, the drive mechanism is arranged at the body portion, the drive mechanism is connected to the telescopic portion in a driving manner, and the first control module comprises:

a fifth control unit, configured to control the drive mechanism to drive the telescopic portion to at least partially extend out of the body portion when the first temperature is greater than the first preset temperature; and the second control module comprises:

a sixth control unit, configured to control the drive mechanism to drive the telescopic portion to retract into the body portion when the second temperature is greater than the second preset temperature.

14. The control apparatus according to claim 10, further comprising:

a second detection module, configured to detect a battery level of the telescopic electronic device; and a fourth control module, configured to control, when the battery level is greater than or equal to a preset battery level, the first coil, the second coil, and the third coil to be in the power-off state.

15. A terminal device, comprising a processor, a memory, and a program or an instruction stored on the memory and executable on the processor, the program or instruction, when executed by the processor, implementing steps of the control method according to claim 5.

16. The terminal device according to claim 15, the program or instruction, when executed by the processor, further implementing steps:

controlling the telescopic electronic device to be in the second state, and controlling the first coil to be in a power-off state; and the controlling the telescopic electronic device to be in the first state comprises:

controlling the telescopic electronic device to be in the first state, and controlling the second coil to be in the power-off state.

17. The terminal device according to claim 15, wherein the wireless charging apparatus further comprises a heat dissipation apparatus, the heat dissipation apparatus is arranged on a body of the wireless charging apparatus, in a case that the telescopic electronic device is opposite to the wireless charging apparatus, the heat dissipation apparatus is located at a side of the telescopic electronic device and faces at least one of the body portion and the telescopic portion, and when the program or instruction is executed by the processor, further steps are implemented:

controlling the heat dissipation apparatus to be in an operating state when the first temperature is greater than the first preset temperature, or the second temperature is greater than the second preset temperature.

18. The terminal device according to claim 15, wherein the telescopic electronic device further comprises a drive mechanism, the drive mechanism is arranged at the body portion, and the drive mechanism is connected to the telescopic portion in a driving manner, and when the program or instruction is executed by the processor, further steps are implemented:

controlling the drive mechanism to drive the telescopic portion to at least partially extend out of the body portion; and the controlling the telescopic electronic device to be in the first state comprises:

controlling the drive mechanism to drive the telescopic portion to retract into the body portion.

19. The terminal device according to claim 15, wherein when the program or instruction is executed by the processor, further steps are implemented:

detecting a battery level of the telescopic electronic device; and controlling, when the battery level is greater than or equal to a preset battery level, the first coil, the second coil, and the third coil to be in the power-off state.

20. A non-transitory readable storage medium, storing a program or an instruction, the program or instruction, when executed by a processor, implementing steps of the control method according to claim 5.

\* \* \* \* \*